US009881249B2

United States Patent
Lamb et al.

(10) Patent No.: US 9,881,249 B2
(45) Date of Patent: *Jan. 30, 2018

(54) UNIQUE METHOD TO SIMULTANEOUSLY MANUFACTURE PAPER SUBSTRATE TRANSACTION CARD AND DISPLAY CARRIER

(71) Applicant: Optimum Card Solutions, LLC, Addison, IL (US)

(72) Inventors: Mark A. Lamb, Hinsdale, IL (US); Joseph R. Hogan, Plainfield, IL (US)

(73) Assignee: Optimum Card Solutions, LLC, Addison, IL (US)

( * ) Notice: Subject to any disclaimer, the term of this patent is extended or adjusted under 35 U.S.C. 154(b) by 379 days.

This patent is subject to a terminal disclaimer.

(21) Appl. No.: 14/685,247

(22) Filed: Apr. 13, 2015

(65) Prior Publication Data
US 2015/0310322 A1  Oct. 29, 2015

Related U.S. Application Data

(63) Continuation-in-part of application No. 14/264,197, filed on Apr. 29, 2014, now Pat. No. 9,527,333.

(51) Int. Cl.
*G06K 19/02* (2006.01)
*G06K 19/077* (2006.01)

(52) U.S. Cl.
CPC .............. *G06K 19/07718* (2013.01)

(58) Field of Classification Search
CPC ...... B42D 25/47; B42D 25/475; B42D 25/41; B42D 25/285; B42D 25/23; B42D 25/369; B42D 25/305; G06K 19/07718
See application file for complete search history.

(56) References Cited

U.S. PATENT DOCUMENTS

| 5,650,209 A | * | 7/1997 | Ramsburg | ............ G09F 3/0288 229/71 |
|---|---|---|---|---|
| 9,527,333 B2 | * | 12/2016 | Lamb | ..................... B42D 25/47 |

* cited by examiner

*Primary Examiner* — Daniel McNally
(74) *Attorney, Agent, or Firm* — Tolpin & Partners, PC; Thomas W. Tolpin

(57) ABSTRACT

An in-line process is provided for economical and concurrent manufacture of attractive flat paper substrate transaction cards and display carriers with or without an RFID chip embedded therein. In the user-friendly process, one or more continuous webs from roller paper are automatically fed and sequentially advanced through a series of operations and stations in a single pass to simultaneously produce the flat paper substrate transaction cards and display carriers.

20 Claims, 6 Drawing Sheets

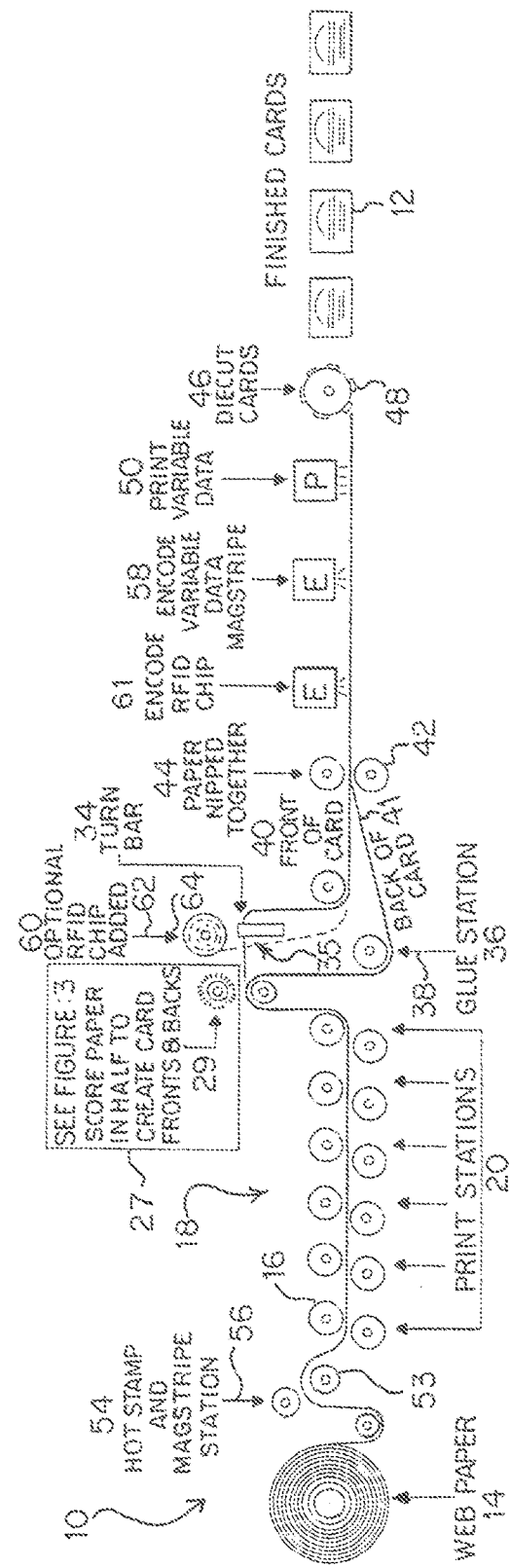

CARD FRONTS AND BACKS GLUED TOGETHER

CARD FRONTS AND BACKS GLUED TOGETHER

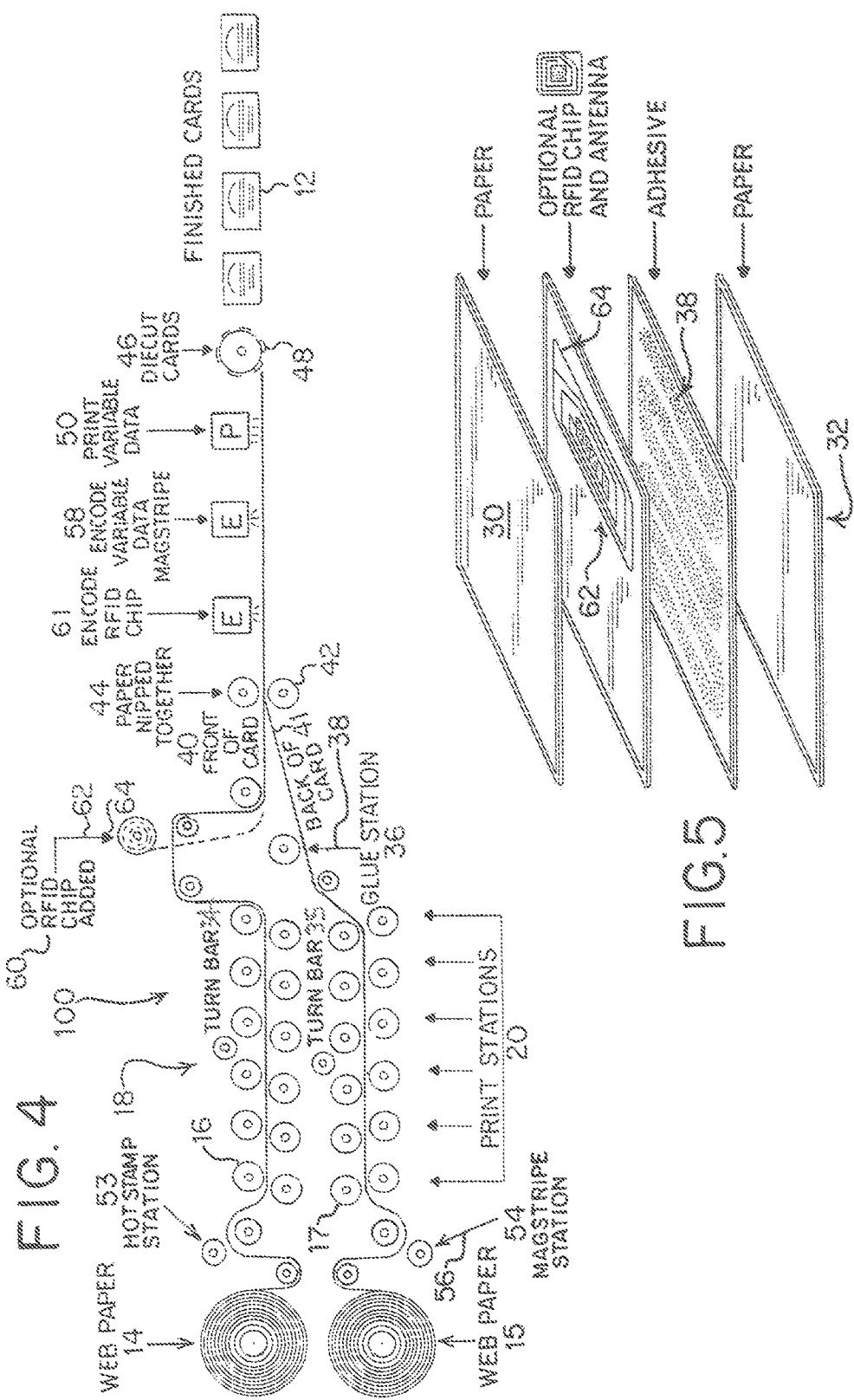

UNIQUE METHOD TO SIMULTANEOUSLY MANUFACTURE PAPER SUBSTRATE TRANSACTION CARD AND DISPLAY CARRIER

BACKGROUND OF THE INVENTION

This invention relates to paper substrate transaction card and display carrier, and more particularly, to the method of simultaneously manufacturing paper substrate transaction cards and display carriers.

Current manufacturing of paper transaction card and display carrier are taking place using the same manufacturing sheet-fed methods used to produce plastic substrate transaction cards and in a separate production run to manufacture paper substrate display carriers to which the transaction cards get affixed to in order to be displayed for sale. This results in an overall cost of the paper transaction card/carrier to be either the same or more expensive than the traditional plastic transaction card/carrier even though base materials may be a lower cost for paper transaction cards and display carriers than plastic transaction cards and their accompanying paper substrate display carriers.

Current manufacturers of paper transaction cards employ sheet-fed methods for manufacture because the American National Standards Institute (ANSI) specifications require transaction cards to be between 24 and 30 mils thick (plus or minus 10%). Intuition tells most manufacturers that substrates in the defined thicknesses are unlikely to lie flat if they are manufactured off rolled substrates (continuous web). Because a majority of transaction cards must have their magnetic stripe swiped through a card reader for validation and activation purposes it is imperative that the transaction card remain almost perfectly flat.

Currently paper substrate transaction cards are made by feeding and printing single sheets of paper 24 to 30 mils thick (plus or minus 10%). Paper stock can be finished to the preferred thickness usually 24 or 30 mils. Traditional paper substrate transaction card manufacturers currently do not have the capability to perfect paper sheets to the preferred thickness while also printing fronts and backs of the card let alone simultaneously printing the display carrier at the same time through one press pass. Rather, these traditional paper card/carrier manufacturers must first print the fronts of the card, then turn the sheets over and run the sheets through the press again in order to print the card backs or vice versa. On each sheet a step and repeat method allows for the production of up to 100 cards per sheet with most manufacturers producing 80 cards per sheet. They employ an entirely separate production run for the manufacture of accompanying display carriers stepped and repeated in smaller increments on the sheet layout as most display carriers are more than two times larger than transaction cards.

Depending upon the capabilities and the equipment, traditional paper card/carrier manufacturers have to add special varnishes or ultraviolet light-cured (UV) finishes that requires a separate pass through a different manufacturing and printing machine. This may also be true if the transaction card/carrier decoration requires metallic or holographic foils. Card/carrier designers may also require a very thick layer of ink or varnish that traditionally requires silkscreen manufacturing equipment and yet another manufacturing operation and pass.

A traditional manufacturer of paper or plastic transaction cards usually adds the cards' magnetic stripes in a separate operation by laminating a thin film laminate already containing the magnetic stripe in the proper position to the reverse of the card sheet. Next the sheet of cards either goes directly through a die-cutting process or goes through a sheet cutting process to reduce the sheet of cards down to smaller sheets in order to go through the die cutting process.

For cards that require a radio frequency identification (RFID) chip and antenna, the traditional card manufacturer must print separate sheets of paper, such as half normal thickness, for the card fronts and backs. Then, a thin film laminate with the RFID chips and antennas are placed in the proper position to follow the layout of the card, the manufacturer has to align the front sheet, the RFID sheet and the back sheet all together, then put it through a lamination process before going through the die cutting process.

Once the cards have been die cut to single cards a separate operation has to be performed to encode the magnetic stripe (usually to embed the card's serial number into it so that a magnetic stripe reader can read it for validation) and add a serial number using inkjet or thermal printing.

Single cards may also have to go through an RFID encoder to program the cards' RFID chips. Numbering can also be done together with this operation. Usually the manufacturer cannot encode the magnetic stripe and encode the RFID chip in the same pass.

With or without RFID, in the past when a transaction card was also required to be affixed to a display carrier, the card and the carrier were always produced in separate production runs. The main reason other than most traditional card-on-carrier applications are plastic card on paper carrier (two different substrates) is because the display carrier is a much thinner substrate than the transaction card (usually half as thick). Up until now this has made simultaneous production impossible and impractical.

Because the current traditional manufacturing method for paper substrate transaction cards are priced comparably or higher compared to plastic substrate card, adoption to paper card by conventional techniques has been slow even though a paper card biodegrades much faster than plastic.

Transaction card buyers want to be "green" but feel they can only be green if paper transaction cards are at least as economical as or more economical than plastic transaction cards.

The manufacturing costs of such an invention for manufacturing paper substrate transaction cards offer great benefits over current traditional manufacturing methods even when just manufacturing transaction cards alone. By also adding the benefit being able to simultaneously produce the display carrier (which many transaction cards must have for selling displays) economic benefits are even greater over traditional methods.

It is, therefore, desirable to provide an improved method for manufacturing paper substrate transaction cards and display carrier which overcomes most, if not all of the preceding problems and disadvantages.

BRIEF SUMMARY OF THE INVENTION

An improved method (process) is provided for manufacturing and producing paper substrate transaction cards and display carriers. Advantageously, the improved method is easy to use, effective, and economical. The improved method produced unexpected surprisingly good results. Significantly, this invention can produce transaction cards with or without RFID technology alone or with transaction card and display carriers being manufactured side by side in one operation.

The improved method for manufacturing and producing paper substrate transaction card and display carrier, can comprise of the following steps:

(a) feeding a substantially continuous web of paper through a set of printing rollers at one or more print stations (FIG. 1)
(b) printing images in proximity to each other on the web at the print station(s);
(c) advancing the printed web to a slitting station;
(d) slitting the printed web to form a card front and back comprising the front and back of a transaction card and an accompanying display carrier at the slitting station (FIGS. 1, 2, 2A, 2B, 2C and 2D). The accompanying display carrier can be on either side of the slit, i.e. alongside the front of the transaction card or alongside the back of the transaction card.
(e) or, scoring then folding the card front and back upon each other to form the card (FIGS. 3 and 1A) (this scoring method for creating a transaction card cannot accommodate the production of an accompanying display carrier);
(f) advancing the front and back of the transaction card/carrier to a glue station (display carrier doesn't require adhesive);
(g) applying an adhesive to at least part of the front and back of the transaction card at the glue station to provide adhesive-coated web sections;
(h) advancing the adhesive-coated web sections through a set of alignment rollers at an alignment station;
(i) aligning the adhesive-coated web sections comprising the front and back of the transaction card at the alignment station;
(j) bonding the aligned adhesive-coating web sections comprising the front and back of the transaction card that in effect, now makes part of the web doubly thick since the front and back of the transaction card are now joined and act like a single piece (the display carrier still remains at the original thickness of the original paper substrate web);
(k) advancing the aligned and bonded transaction card along with the display carrier still attached to the part of the web that now contains the double thickness transaction card and single thickness display carrier to a die cut station; and
(l) die cutting the aligned and bonded transaction card and display carrier at the die cut station;
(m) or alternately, doing substantially all the above except starting the process with two different paper webs (FIG. 4) rather than slitting and maneuvering the two halves of the web together to form the cards' front and back along with the accompanying display carrier or scoring the web, then folding the web in half to form the card front and back (the scoring method is primarily good for cards only and cannot accommodate the simultaneous one pass production of accompanying display carriers).

In the improved method for manufacturing paper substrate transaction cards and display carriers, the paper can range in thickness from 7 to 20 mils. This will result in the transaction card thickness of 14 to 40 mils including the added adhesive. This will also result in the accompanying display carrier to remain at the thickness of the paper substrate web. Results should render the transaction card and display carrier as flat as ANSI standards allow.

The preferred method includes printing the web at a press, such as a webflexo type press, web letterpress or web offset type press, using enough printing stations as to allow the card and display carrier to be manufactured in a single pass. A magnetic stripe can be added to the web at a magnetic stripe station, such as at a location either before printing or upstream of the print station(s), and/or a radio frequency identification (RFID) chip can be added to the web at an RFID station, such as at a location either before printing or downstream of the print station(s).

The method for manufacturing paper substrate transaction cards and display carriers can also include: decorating the printed web at a decorating station with decoration, such as with variable data, special ink, varnish, ultraviolet (UV) coating, silk screen printing, special die-cutting and metallic foil, and/or holographic foil.

A paper substrate transaction card and accompanying display carrier manufactured in continuous web form in accordance with the improved method can provide the following advantages:

1. Lower cost compared to traditional plastic and traditionally manufactured paper transaction card and display carrier.
2. Able to print the card fronts and backs in a single press pass.
3. Able to print the display carrier at the same time as printing the card fronts and backs (not a separate operation).
4. Able to more easily add a magnetic stripe (not a separate operation).
5. Able to more easily add a RFID chip and antenna between paper layers (not a separate operation).
6. Substantially lowers the production turnaround time compared to traditional manufacturing.
7. Substantially less costly to add decorating effects such as special inks, varnishes, UV coatings, silk screens, die cuts and decorative metallic and holographic foils (not separate operations).
8. Method makes in-line magnetic stripe encoding possible (not a separate operation).
9. Method makes in-line encoding of RFID chip possible (not a separate operation).
10. Method makes in-line serial numbering possible (numbering and the encoding of a magnetic stripe and/or RFID chip can be done together).
11. Method makes in-line die cutting of individual transaction card and display carrier possible (not a separate operation).
12. This new manufacturing method can allow the cost of the paper transaction card and its accompanying display carrier to be priced 20 to 120 percent less than plastic transaction cards attached to paper display carriers which should be incentive enough for transaction card and display carrier buyers to embrace transition from plastic to paper.

A more detailed explanation of the invention is provided in the following detailed descriptions and appended claims taken in conjunction with the accompanying drawings.

BRIEF DESCRIPTION OF THE DRAWINGS

FIG. 1A is a process flow diagram of a method to manufacture paper substrate transaction card in which the paper is scored in half to create card fronts and backs in accordance with principles of the present invention. Manufacturing an accompanying display carrier in a single pass simultaneously with the paper substrate transaction card is not possible using this manufacturing method.

FIG. 4 is a double web process flow diagram of a method to manufacture paper substrate transaction card and optional display carrier in accordance with principles of the present invention.

FIG. 5 is an exploded assembly view of a paper substrate transaction card in accordance with principles of the present invention.

DETAILED DESCRIPTION OF THE INVENTION

The following is a detailed description and explanation of the preferred embodiments of the invention and best modes for practicing the invention.

Figure 1:
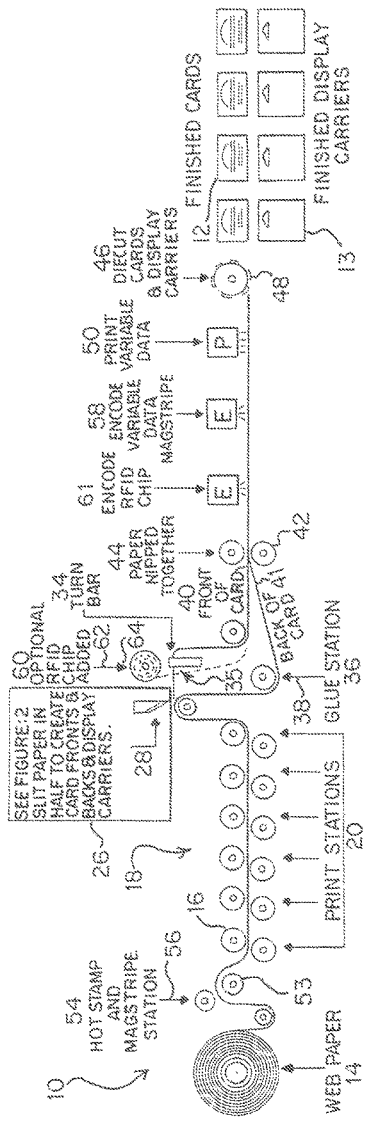
FIG. 1 is a process flow diagram of a method to manufacture paper substrate transaction cards and display carriers in which the paper is slit in half to create card fronts and backs and a display carrier in accordance with principles of the present invention.
Figure 2:
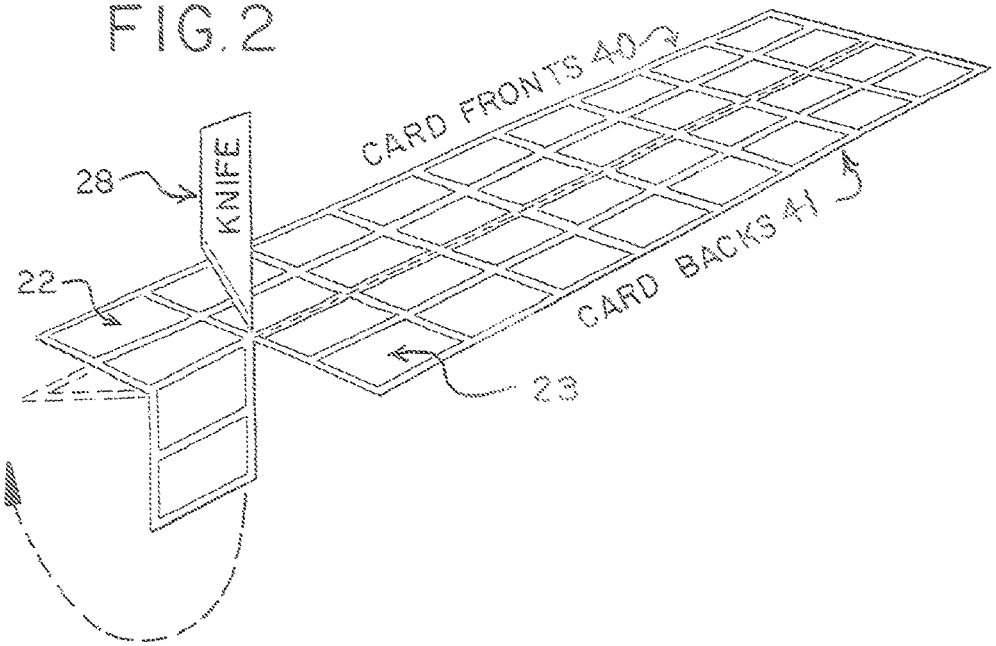
FIG. 2 is a slice and fold diagram showing part of the method to manufacture paper substrate transaction card of FIG. 1 in accordance with principles of the present invention.
Figure 2A:
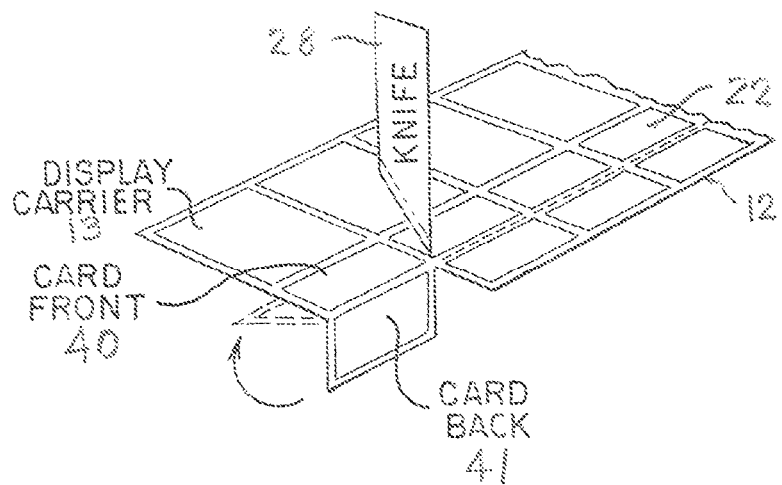
FIG. 2A is a slice and fold diagram showing part of the method to simultaneously manufacture in a single pass, paper substrate transaction cards and display carriers of FIG. 1 in accordance with principles of the present invention.
Figure 2B:
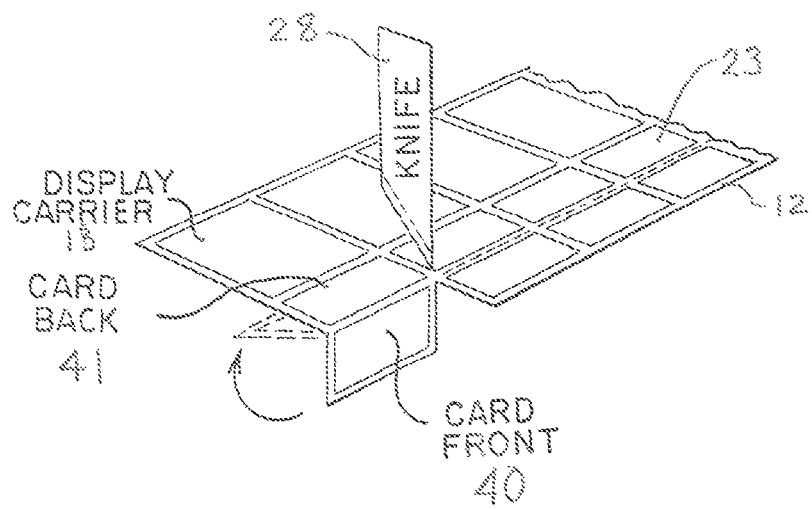
FIG. 2B is a slice and fold diagram similar to FIG. 1A but with the card front in the position the card back took in FIG. 1A in accordance with principles of the present invention.
Figure 2C:
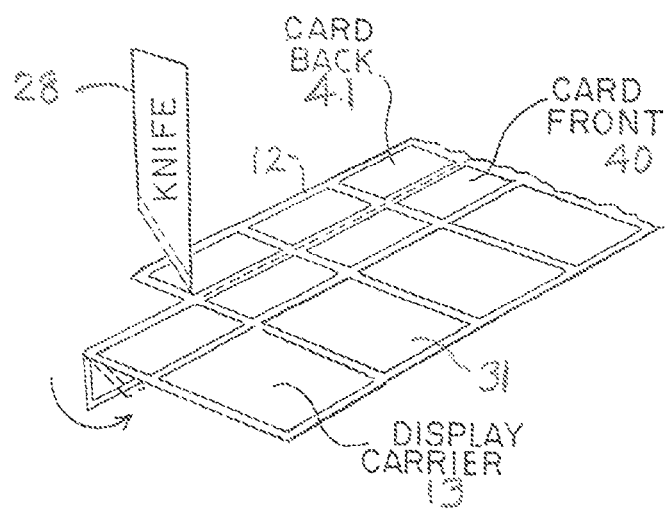
FIG. 2C and FIG. 2D are other slice and fold diagrams showing that the carrier position can be below the card front and back or card back and front in accordance with principles of the present invention.
Figure 2D:
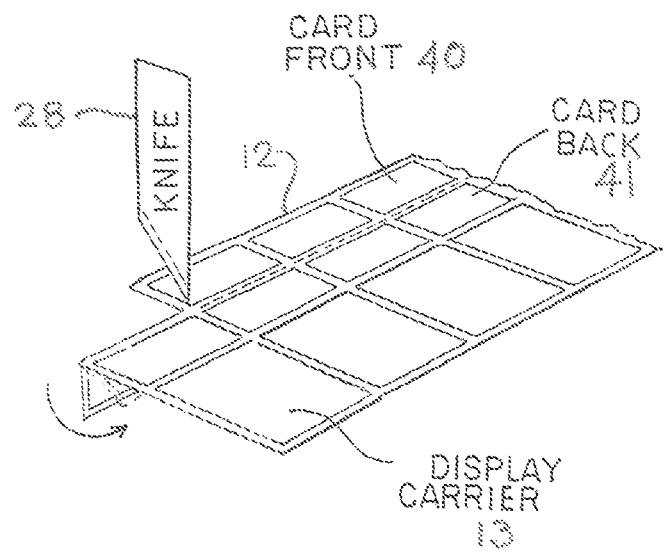

Referring to the drawings, an improved method (process) 10 (FIG. 1) is provided for simultaneously manufacturing and producing paper substrate transaction cards 12 and paper substrate display carriers 13 from the same web in a single pass (FIGS. 1, 2A, 2B, 2C, and 2D). The method can comprise automatically, continuously and/or sequentially feeding a substantially continuous web of paper 14 (FIG. 1) from a roll of paper through a set, series and/or array of printing rollers 16 of a press 18 at one or more print station(s) 20 and currently and/or simultaneously printing different images including front card images 22 (card front images) and back card images 23 (card back images) (FIGS. 2, 2A and 2B) side by side on the web at the print station(s) in a single pass. The printed web can be automatically advanced, continuously moved and/or conveyed from the print station(s) to a slitting station 26 (FIG. 1) or dividing station where the printed web is slit and/or cut preferably in half with a knife 28 (FIGS. 1, 2, 2A, 2B, 2C, and 2D), such as a reciprocating or stationary blade, or other cutting tool to form a card front 40 (FIGS. 2, 2A, 2B, 2C, 2D, and 5) and card back 41 comprising the front and back of a transaction card and a front and back of a display carrier 13 at the slitting station (FIGS. 2A, 2B, 2C, and 2D). In the illustrative embodiment, at least part of the front of the transaction card has one or more different images than the back of the transaction card. FIGS. 2A, 2B, 2C and 2D represent the different conditions for manufacturing the card 12 along with an accompanying display carrier 13. Namely, the display carrier can be configured to be manufactured above the card front 40 as shown in FIG. 2A. It can also be configured in such a manner that the display carrier is manufactured above the card back 41 as shown in FIG. 2B. The display carrier can also be manufactured below the card front as shown in FIG. 2C or below the card back as shown in FIG. 2D. The display carriers' back images are almost always printed face up in order to affix the card to the carrier downstream or off line. The accompanying display carrier is shown on the side of the front of the transaction card in FIGS. 1, 2A and 2C but can also be reversed as shown in FIGS. 2B and 2D to be part of the reverse of the transaction card as well. As shown in FIG. 1, the card front and back of the transaction card can be folded upon each other by a turn bar 34 at a folding station 35. The display carriers can be on either divided web depending upon the production configuration as shown in FIGS. 2A, 2B, 2C and 2D.

The back and/or front of the transaction card and display carrier can be automatically advanced, continuously moved, and/or conveyed, from the slitting station to a glue station 36 (FIG. 1) where at least part of the back and/or front of the transaction cards are coated and/or glued with an glue and/or other adhesive 38 at the glue station to provide adhesive-coated web sections. The adhesive-coated web sections can be automatically advanced, continuously moved and/or conveyed from or at the glue station to through a set, series and/or array of alignment rollers 42 at an alignment station 44 to align, sandwich and nip together the adhesive-coated web sections comprising the front and back of the transaction card in registration with each other along with the unglued display carrier still attached on the web of paper substrate. The aligned adhesive-coating web sections comprising the front and back of the transaction card can be bonded and fixedly secured to each other. The card fronts and backs can be glued together as shown in FIGS. 2, 2A, 2B, 2C, 2D, and 3.

The aligned and bonded transaction card along with the accompanying display carrier can be automatically advanced, continuously moved and/or conveyed to a die cut station 46 where both the aligned and bonded transaction card and display carrier are die cut to form a substantially planar and flat paper substrate transaction card and display carrier. The die cut station can include a die cutter machine 48, tool or mechanism. The display carrier can be optionally punched at the die cut station in the same operation.

The printed web can be automatically advanced, continuously moved and/or conveyed to one or more decorating stations which can include hot stamp metallic or holographic foil 54 (FIG. 1), and/or variable data 50, special ink, varnish, ultraviolet (UV) coating, silk or screen printing which can be conveyed by using one or more print stations 20 (FIG. 1).

Optionally, in the improved method for manufacturing paper substrate transaction cards and display carriers, the web of paper can be automatically advanced, continuously moved, and/or conveyed through rollers 53 to a hot stamp and magnetic stripe station 54 (FIG. 1), such as at a location positioned upstream of the print station(s), where a magnetic stripe 56 can be inserted and/or added to the web. The magnetic stripe and transaction card/carrier can be encoded and embedded with a serial number at a magnetic stripe encoding station 58, such as at a location positioned downstream of the alignment station.

Optionally, in the improved method for manufacturing paper substrate transaction cards and display carriers, the printed, folded and glued web can be automatically advanced, continuously moved, and/or conveyed to a radio frequency identification (RFID) station 60 (FIG. 1), such as at a location positioned downstream of the print station(s), where an RFID chip 62 and antenna 64 (FIG. 5) can be inserted and/or added to the web, such as comprising the front of the card. The RFID chip can be encoded at a RFID encoding station 61 (FIG. 1).

Figure 3:
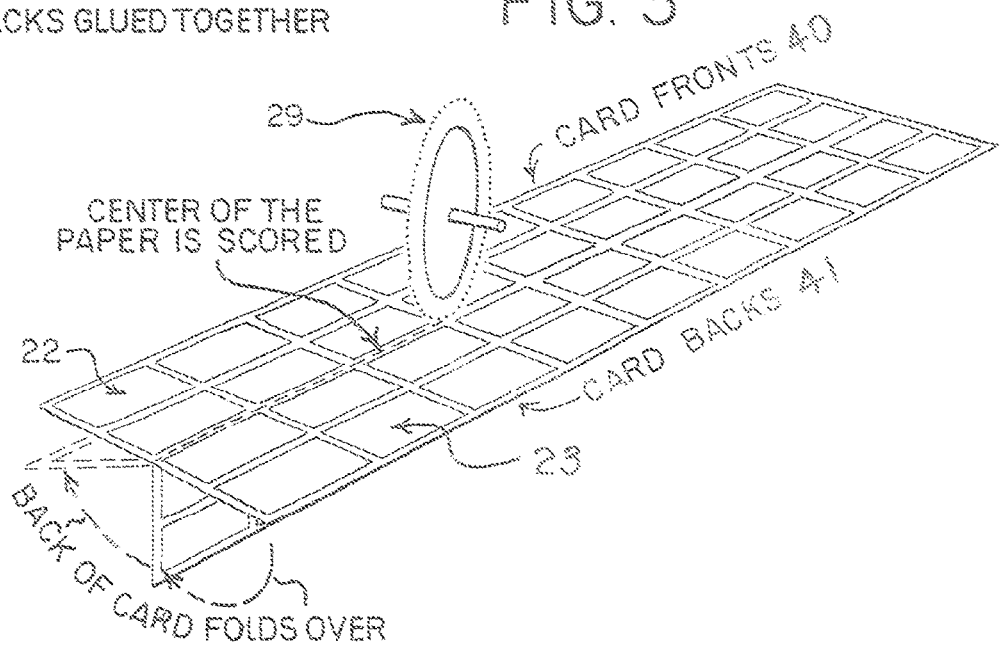
FIG. 3 (on the same sheet as FIG. 2) is a score and turn diagram showing part of the method to manufacture paper substrate transaction card of FIG. 1A in accordance with principles of the present invention.

The method (process) 10 of FIG. 1A is similar to the method (process) of FIG. 1, except that the center of the paper is scored or perforated in half at a scoring/perforating station 27 or dividing station with a perforating knife or a rotary or rotatable circular scoring blade 29 (FIGS. 1A and 3) or other scoring tool. The back of the cards can be folded over and the card front and backs can be glued together as shown in FIG. 3. An accompanying display carrier cannot be manufactured together with the transaction card using this scoring manufacturing method.

The double web method (process) 100 of FIG. 4 is similar to the method (process) of FIG. 1, except that two substantially continuous webs of paper comprising an upper (outer) web 14 and a lower (inner) web 15 are automatically, continuously and/or sequentially fed through a set, series and/or array of rollers 16 and 17 of a press(es) 20 at print stations. The upper web can comprise the front 40 of the card and the accompanying display carrier (if it hasn't been configured to be part of the back of the card) and can be passed through a hot stamp station 53. The lower web can provide the back 41 of the card (and also could be configured to contain the accompanying display carrier) and can pass through a magnetic stripe station 54 where a magnetic stripe 56 can be inserted and/or added to the lower web. A RFID chip 62 can be inserted and/or added to the upper web at the RFID station 60. Because there are two continuous webs in the double web method 100 of FIG. 4 which form the front and back of the card and display carrier, there is no need for a slitting station 26 (FIG. 1) and knife 28, nor a turn bar 34 and folding station 35, nor is there a need in the double web method 100 of FIG. 4 that the center of the paper web be scored in half at a scoring/perforating station 27 (FIG. 1A) with a knife, such as rotary or rotatable circular blade 29 or other cutting tool. A turn bar could be used on the web that contains the display carrier in order to continue to print the reverse side of the display carrier. Depending on the print configuration, the top or bottom web could have accompanying display carriers side by side with either the front or back of the transaction cards. This could require going through turn bars 34 and 35 (FIG. 4) to print the back or front of the display carriers.

In one preferred embodiment and method for manufacturing paper substrate transaction cards and display carriers, the paper in the web from about 7 mils to about 20 mils, resulting in the transaction card having a range in caliper thickness from about 14 to about 40 mils, with the display carrier remaining the original paper web caliper thickness.

The transaction cards can comprise a gift card or a credit card or another type of card. Preferably the transaction card is generally rectangular with rounded corners, and complies with the specification requirements of the American National Standards Institute (ANSI). Gift cards can be CR-80 type cards. The transaction card can be a standard dimension transaction card that readily fits into most purses and wallets. Gift cards generally have the same dimensions. The display carrier can be all manner of shapes and sizes but most are rectangular in shape with rounded corners, mostly containing a hole punched into the top in order to be placed on a display rod for selling/marketing purposes and carry dimensions, such as approximately four inches wide by six inches tall. The gift card and display carrier can be configured to be one piece, also commonly referred to as an M-6 type gift card in which the CR-80 type gift card stays with the display carrier as a single piece or detaches off the larger format M-6 card/carrier. The M-6 card/carrier provides a gift card and a backer which provides a card holder to hold the card/carrier on a peg, such as at a kiosk at a grocery store or retail store. In some circumstances, it may be desirable that the gift card/carrier or other transaction card/carrier have a different shape and/or different dimensions. Preferably the magnetic stripe is 3⅜ inches (85.725 mm) long and is affixed to the transaction card/carrier along its width and up to 5 mm from the card/carrier edge. The card/carrier can also be large enough to accommodate a radio frequency identification (RFID) chip and antenna, if desired.

Each of the images can comprise: a logo, indicia, symbol, design, trademark, service mark, brand name, company name, black indicia, white indicia, colored indicia, characters, letters, words, numbers, graphics, design, photograph, picture, flag, hologram, laser etched image, embossed image, imprinted image, stamped image, screen printed image, printed image, or combinations of any of the preceding.

RFID can provide many advantages and technology enhancements to the traditional transaction card. However because of the traditional methods to add the RFID technology, these enhancements have been very slow to be embraced due to the high production costs for adding RFID. The new manufacturing method of this invention allows for a much lower production cost that will help industries embrace the technology. Significantly, to add RFID capabilities to a retail gift transaction card, the inventive technology offers a very efficient, low cost way to keep inventory throughout the retail distribution chain especially in the third-party distribution chain of grocery stores, discount stores and other retailers that offer gift cards other than just their own brand. The invention technology can allow gift cards and other types of transaction cards to be redeemed near field to an RFID reader compared to the present magnetic stripe card/carrier reader that has to be swiped into the system. The RFID technology will allow a gift card recipient to tap the gift card to his/her smart phone in order to listen to a personalized graphic, audio or video message from the card/carrier buyer. Retailers will be able to also offer personalized offers to individual gift card holders and have the ability to have special hot spots in their locations that activate the RFID gift card in such a way that directs the gift card holder to a special location in the store or offers a special bonus for visiting the location.

As previously indicated, among the many advantages of a paper substrate transaction cards and display carriers manufactured simultaneously in continuous web form in accordance with the improved method are the following:

1. Lower cost compared to traditional plastic and traditionally manufactured paper transaction card and accompanying paper display carrier.
2. Able to print the card/carrier fronts and backs in a single press pass.
3. Able to print the display carrier in a single press pass along with the card fronts and backs (not a separate operation).
4. Able to more easily add a magnetic stripe (not a separate operation).
5. Able to more easily add a RFID chip and antenna between paper layers (not a separate operation).
6. Substantially lowers the production turnaround time compared to traditional manufacturing.
7. Substantially less costly to add decorating effects such as special inks, varnishes, UV coatings, silk screens special die cuts, and decorative metallic and holographic foils; (not separate operations).

8. Method makes in-line magnetic stripe encoding possible (not a separate operation).
9. Method makes in-line encoding of RFID chip possible (not a separate operation).
10. Method makes in-line serial numbering possible (numbering and the encoding of a magnetic stripe and/or RFID chip are traditionally done together).
11. Method makes in-line die cutting of individual transaction card and display carrier possible (not a separate operation).
12. This new manufacturing method will allow the cost of the paper transaction card and display carrier to be priced 20 to 120 percent less than plastic transaction cards affixed to paper display carriers which should be incentive enough for transaction card and display carrier buyers to purchase paper substrate transaction cards and display carrier.

Among the many other advantages of the improved method to manufacture paper substrate transaction cards and display carriers are:

13. Superior process.
14. Outstanding performance.
15. Superb transaction cards and display carriers.
16. Better results.
17. User friendly.
18. Reliable.
19. Easy to use.
20. Durable.
21. Economical.
22. Attractive.
23. Effective.

Although embodiments of the invention have been shown and described, it is to be understood that various modifications, substitutions, and rearrangements of parts, components, and/or process (method) steps, as well as other uses, shapes, construction, and design of the paper substrate transaction cards and display carriers can be made by those skilled in the art without departing from the novel spirit and scope of this invention.

What is claimed is:

1. A method for manufacturing paper substrate transaction cards and display carriers, comprising the steps of:
   feeding at least one substantially continuous web of paper through a set of printing rollers at least one print station;
   printing images in proximity to each other on the web at the print station;
   forming a card front and back comprising the front and back of a transaction card contain a display carrier;
   applying an adhesive to at least part of the front and back of the transaction card at a glue station to provide adhesive-coated web sections;
   advancing the adhesive-coated web sections through a set of alignment rollers;
   aligning the adhesive-coated web sections comprising the front and back of the transaction card with the alignment rollers;
   bonding the aligned adhesive-coating web sections comprising the front and back of the transaction card;
   advancing the aligned and bonded transaction card and accompanying display carrier to a die cut station; and
   die cutting the aligned and bonded transaction card and display carrier at the die cut station.

2. The method for manufacturing paper substrate transaction card and display carrier in accordance with claim 1 wherein the paper ranges in thickness from 7 to 20 mils.

3. The method for manufacturing paper substrate transaction card and display carrier in accordance with claim 1 including
   advancing the printed web to a slitting station;
   slitting the printed web to form the card front and back comprising the front and back of a transaction card and the accompanying display carrier at the slitting station; and
   folding the card front and back upon each other.

4. The method for manufacturing paper substrate transaction card and display carrier in accordance with claim 1 including:
   advancing the printed web to a scoring station;
   scoring the printed web to form the card front and back comprising the front and back of a transaction card at the scoring station;
   folding the scored card front and back upon each other.

5. The method for manufacturing paper substrate transaction card and display carrier in accordance with claim 1 including:
   simultaneously and separately feeding two continuous webs of papers through printing rollers of print stations; and
   bringing the two webs together with one conveying the front of the card along with the display carrier and the other conveying the back of the card along with the display carrier.

6. The method for manufacturing paper substrate transaction card and display carrier in accordance with claim 1 wherein the transaction card ranges in thickness from 14 to 40 mils and the accompanying display carrier ranges in thickness from 7 to 20 mils.

7. The method for manufacturing paper substrate transaction cards and display carriers in accordance with claim 1 wherein the transaction card and accompanying display carrier is produced as flat as accepted in the ANSI standards established for transaction card and display carrier production.

8. The method for manufacturing paper substrate transaction cards and display carriers in accordance with claim 1 including printing the web at a press at least one print station in a single pass.

9. The method for manufacturing paper substrate transaction cards and display carriers in accordance with claim 1 including adding a magnetic stripe to the web at a magnetic stripe station.

10. The method for manufacturing paper substrate transaction cards and display carriers in accordance with claim 1 adding a radio frequency identification (RFID) chip to the web at an RFID station.

11. The method for manufacturing paper substrate transaction cards and display carriers in accordance with claim 1 including decorating the printed web at a decorating station with decoration selected from the group consisting of variable data, special ink, varnish, ultraviolet (UV) coating, silk screen printing, special die cutting, metallic foil, holographic foil, and combinations thereof.

12. A method for manufacturing paper substrate transaction cards and display carriers, comprising the steps of:
    feeding a substantially continuous web of paper from a roll of paper through a series of printing rollers of a press at a print station;
    concurrently printing different images side by side on the web at the print station;
    continuously moving the printed web to a slitting or scoring station;

slitting or scoring the printed web to form a card front and back comprising the front and back of a transaction card and an accompanying display carrier at the slitting station, at least part of the front having a different image than the back of the transaction card;

folding the card front and back upon each other;

continuously moving the front and back of the transaction card and accompanying display carrier to a glue station;

coating at least part of the front and back of the transaction card with an adhesive at the glue station to provide adhesive-coated web sections;

continuously moving the adhesive-coated web sections through a series of alignment rollers;

aligning the adhesive-coated web sections comprising the front and back of the transaction card with the alignment rollers;

bonding the aligned adhesive-coating web sections comprising the front and back of the transaction card;

continuously moving the aligned and bonded transaction card and the accompanying display carrier to a die cut station; and die cutting the aligned and bonded transaction card and accompanying display carrier at the die cut station to form a substantially planar paper substrate transaction card and display carrier.

13. The method for manufacturing paper substrate transaction card and display carrier in accordance with claim 12 wherein the paper display carrier ranges in thickness from 10 to 20 mils and the paper transaction card ranges in thickness from 20 to 40 mils.

14. The method for manufacturing paper substrate transaction card in accordance with claim 12 including:
adding a magnetic stripe to the web at a hot stamp and magnetic stripe station; and
encoding the magnetic stripe and embedding a serial number in the magnetic stripe and transaction card/carrier at an encoding station.

15. The method for manufacturing paper substrate transaction card in accordance with claim 12 including:
inserting a radio frequency identification (RFID) chip and antenna to the web at an RFID station; and
encoding the RFID chip at an encoding station.

16. A double web method for manufacturing paper substrate transaction card and display carrier, comprising the steps of:
feeding substantially continuous double webs of paper from two roll of paper through array of printing rollers of at least one press at print stations;
simultaneously printing different images side by side on at least one of the double webs at the print stations in a single pass or by printing two webs of paper simultaneously in a single pass at the print stations to achieve similar results;
bringing the two webs together with one of the webs conveying the front of the card along with the accompanying display carrier the other web conveying the back of the Card;
conveying the front and back of the transaction card to a glue station;
coating at least part of the front and back of the transaction card with an adhesive at the glue station to provide adhesive-coated web sections;
conveying the adhesive-coated web sections through an array of alignment rollers at an alignment station;
substantially aligning the adhesive-coated web sections comprising the front and back of the transaction card and display carrier with alignment rollers at the alignment station;
bonding the aligned adhesive-coating web sections comprising the front and back of the transaction card;
conveying the aligned and bonded transaction card along with the remaining web containing the display carrier to a die cut station; and
die cutting the aligned and bonded transaction card and the accompanying display carrier at the die cut station to form a substantially planar paper substrate transaction card and display carrier.

17. The double web method for manufacturing paper substrate transaction card and display carrier in accordance with claim 16 wherein:
each web of paper and the display carrier range in thickness from about 10 mils to about 20 mils; and
the transaction card ranges in thickness from about 20 mils to about 40 mils.

18. The double web method for manufacturing paper substrate transaction card and display carrier in accordance with claim 16 including:
decorating the at least one printed web at a decorating station with decoration selected from the group consisting of variable data, special ink, varnish, ultraviolet (UV) coating, silk screen printing, special die cuts, metallic foil, holographic foil, and combinations thereof; and
the images are selected from the group consisting of: a logo, indicia, symbol, design, trademark, service mark, brand name, company name, black indicia, white indicia, colored indicia, characters, letters, words, numbers, graphics, design, photograph, picture, flag, hologram, laser etched image, embossed image, imprinted image, stamped image, screen printed image, printed image, and combinations thereof.

19. The double method for manufacturing paper substrate transaction card and display carrier in accordance with claim 16 including:
adding a magnetic stripe to one of the webs at a magnetic stripe station; and
encoding the magnetic stripe and embedding a serial number in the magnetic stripe and transaction card.

20. The double web method for manufacturing paper substrate transaction card and display carrier in accordance with claim 16 including:
inserting a radio frequency identification (RFID) chip and antenna to the one of the webs; and
encoding the RFID chip.

* * * * *